(12) United States Patent
Yasuda

(10) Patent No.: US 7,466,558 B2
(45) Date of Patent: Dec. 16, 2008

(54) PORTABLE ELECTRONIC DEVICE

(75) Inventor: Shinya Yasuda, Akishima (JP)

(73) Assignee: Casio Hitachi Mobile Communications Co., Ltd., Higashiyamato (JP)

( * ) Notice: Subject to any disclaimer, the term of this patent is extended or adjusted under 35 U.S.C. 154(b) by 94 days.

(21) Appl. No.: 11/448,391

(22) Filed: Jun. 7, 2006

(65) Prior Publication Data

US 2006/0279942 A1 Dec. 14, 2006

(30) Foreign Application Priority Data

Jun. 9, 2005 (JP) ............................. 2005-169648

(51) Int. Cl.
*H05K 5/00* (2006.01)
(52) U.S. Cl. ........................ 361/755; 361/797; 361/800; 361/752
(58) Field of Classification Search .................. 361/752, 361/790, 797, 800; 16/366, 342
See application file for complete search history.

(56) References Cited

U.S. PATENT DOCUMENTS

| | | | | |
|---|---|---|---|---|
| 5,027,394 A * | 6/1991 | Ono et al. .................... 379/434 |
| 5,278,725 A * | 1/1994 | Konno et al. ................. 361/680 |
| 5,541,813 A * | 7/1996 | Satoh et al. .................. 361/752 |
| 5,681,176 A * | 10/1997 | Ibaraki et al. ................ 439/165 |
| 5,995,373 A * | 11/1999 | Nagai .......................... 361/755 |
| 6,872,088 B2 * | 3/2005 | Watanabe .................... 439/165 |
| 7,248,903 B2 * | 7/2007 | Yoda ........................ 455/575.1 |
| 2003/0211873 A1 * | 11/2003 | Komiyama ............... 455/575.3 |
| 2004/0198417 A1 * | 10/2004 | Yoda ........................ 455/550.1 |
| 2005/0225952 A1 * | 10/2005 | Takagi ......................... 361/749 |

FOREIGN PATENT DOCUMENTS

| JP | 2002-139024 | 5/2002 |
|---|---|---|
| JP | 2003-304310 | 10/2003 |
| JP | 2004-214927 | 7/2004 |

* cited by examiner

*Primary Examiner*—Hung S Bui
(74) *Attorney, Agent, or Firm*—Cohen Pontani Lieberman & Pavane LLP

(57) ABSTRACT

Provided is a portable electronic device which employs a simple structure to prevent a waterproof cap fitted in a through hole for a flexible wiring board from coming off outward. The through hole is formed in a side face of an upper housing. The flexible wiring board is inserted into the through hole. The flexible wiring board has the waterproof cap formed therein and fitted in the through hole. A hinge cover member is attached to the upper housing in such a way as to cover the flexible wiring board. A pull-stop claw formed on the hinge cover member covers a flange of the waterproof cap from outside the upper housing.

4 Claims, 6 Drawing Sheets

PORTABLE ELECTRONIC DEVICE

BACKGROUND OF THE INVENTION

1. Field of the Invention

The present invention relates to a portable electronic device having a first housing and a second housing foldable with respect to each other via hinges, and having a flexible wiring board which electrically connects a circuit board accommodated in the first housing to a circuit board accommodated in the second housing.

2. Description of the Related Art

Recent portable electronic devices, such as cellular telephones, mostly have an upper housing and a lower housing coupled in a foldable manner via hinges.

As disclosed in Unexamined Japanese Patent Application KOKAI Publication No. 2002-139024 and Unexamined Japanese Patent Application KOKAI Publication No. 2003-304310, for example, a hinge is covered with a hinge cover to improve the appearance of a portable electronic device. A circuit board accommodated in the upper housing is electrically connected to a circuit board accommodated in the lower housing by a flexible wiring board. The flexible wiring board is retained in the internal space covered with the hinge cover.

As disclosed in Unexamined Japanese Patent Application KOKAI Publication No. 2004-214927, for example, a flexible wiring board is led inside an upper housing and a lower housing via through holes respectively formed in the upper housing and the lower housing. A waterproof cap seal the through hole to prevent water permeation from the through hole.

With the flexible wiring board placed in the through hole, however, opening/closing the upper housing with respect to the lower housing deforms the flexible wiring board.

Therefore, repetitive opening/closing of the upper housing may cause the waterproof cap from coming off the through hole. The technology disclosed in Unexamined Japanese Patent Application KOKAI Publication No. 2004-214927 prevents the waterproof cap from coming off inward of the housing by forming a flange on the waterproof cap and engaging the flange with the outer surface of the housing. However, the waterproof cap may come off outward of the housing.

As a solution to this problem, another flange may be formed on the other side of the waterproof cap and engaged with the inner surface of the flange to prevent the waterproof cap from coming off outward. The additional flange however makes it difficult to fit the waterproof cap in the through hole.

SUMMARY OF THE INVENTION

Accordingly, it is an object of the present invention to provide a portable electronic device which employs a simple structure to prevent a waterproof cap fitted in a through hole for a flexible wiring board from coming off outward.

To achieve the object, a portable electronic device according to the invention comprises:

a first housing which accommodates a first-circuit board;

a second housing which is coupled to the first housing in an openable/closable manner, and accommodates a second circuit board;

a flexible wiring board which electrically connects the first circuit board and the second circuit board together; and a cover member attached to at least one of the first housing and the second housing in such a way as to cover the flexible wiring board, wherein at least one of the first housing and the second housing has a through hole through which the flexible wiring board is inserted, the flexible wiring board has a waterproof member to be fitted in the through hole to seal the through hole, and the cover member has a protrusion which covers the waterproof member from outside.

The waterproof member may have a flange to be engaged with an outer surface of at least one of the first housing and the second housing, and the protrusion may abut on the flange which is held between the protrusion and the outer surface of at least one of the first housing and the second housing.

The protrusion may have a hook-like claw, which covers a side face and a rear face of the flange.

The protrusion may have a claw.

The cover member may be formed integrally at the at least one of the first housing and the second housing.

The invention can easily ensure prevention of a waterproof member from coming off the through hole merely by attaching a cover member which covers a flexible wiring board to the housing.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

The best mode for carrying out the invention will be explained with reference to the accompanying drawings. While various preferable technical limitations are given for carrying out the invention in the following embodiment, the scope and spirit of the invention shall not be limited to the following embodiment and illustrated examples.

Figure 1:
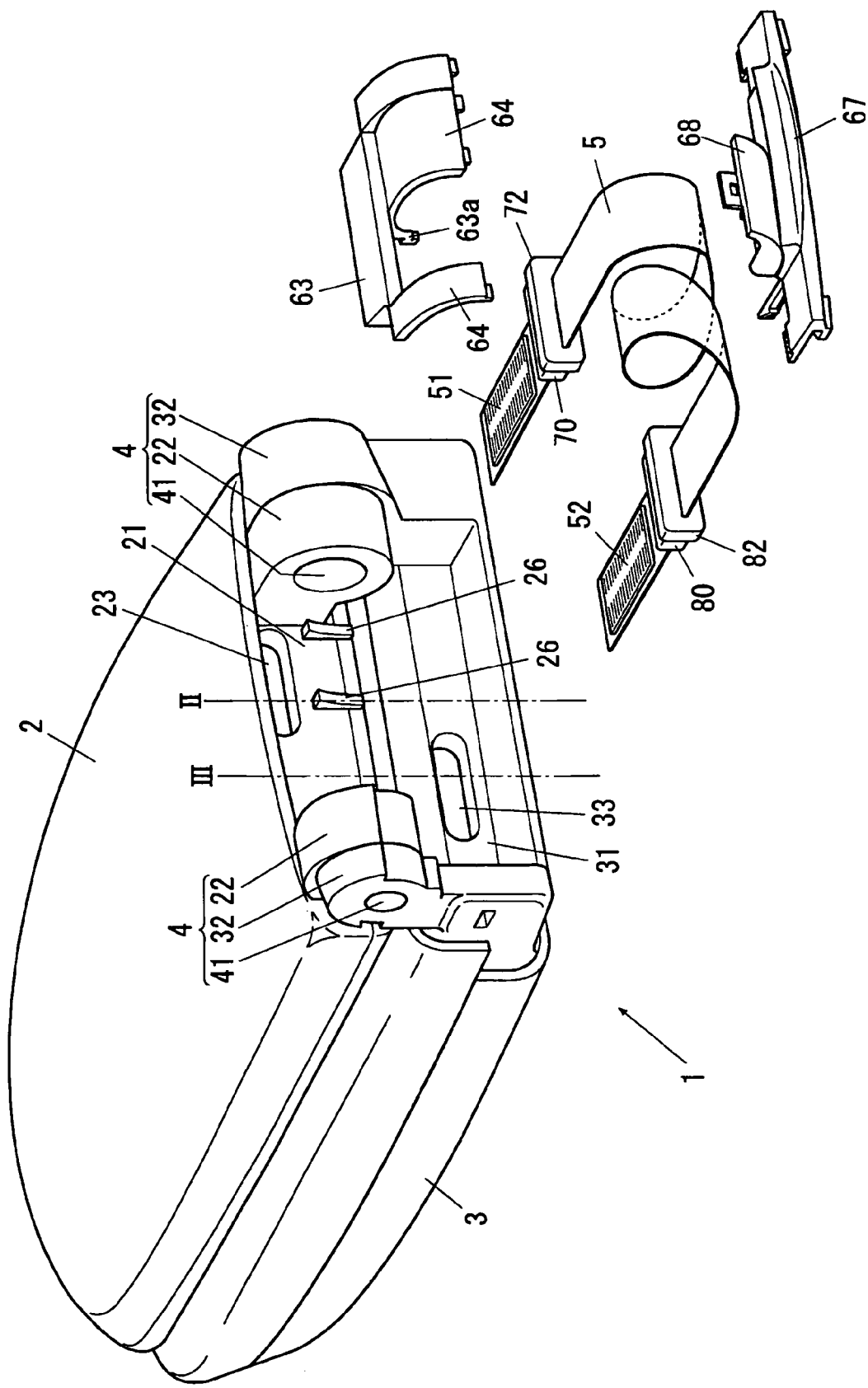
FIG. 1 is a perspective view illustrating a cellular phone, partly exploded, as a first embodiment of a portable electronic device to which the invention is adapted.

FIG. 1 is a perspective view illustrating a cellular phone, partly exploded, as a first embodiment of a portable electronic device to which the invention is adapted.

The cellular phone 1 has an upper housing 2 and a lower housing 3 coupled by a pair of hinges 4. The upper housing 2 is rotatable about the axes of the hinges 4 with respect to the lower housing 3. With the upper housing 2 closed with respect to the lower housing 3, the front face of the upper housing 2 faces the front face of the lower housing 3. With the upper housing 2 opened with respect to the lower housing 3, both front faces of the upper and lower housings 2, 3 face frontward. The upper housing 2 has a top casing and a bottom casing placed over each other.

The lower housing 3 has a top casing and a bottom casing placed over each other, with a rear cover placed over the rear face of the bottom casing. The pair of hinges 4 comprise a pair of cylindrical bodies 22, 22 respectively formed near both ends of a side face 21 of the upper housing 2 which is located on the lower housing 3 side, a pair of cylindrical bodies 32, 32 respectively formed near both ends of a side face 31 of the lower housing 3 which is located on the upper housing 2 side, and a pair of hinge units 41, 41 respectively inserted into one cylindrical body 22 and one cylindrical body 32, and the other cylindrical body 22 and the other cylindrical body 32.

The pair of hinge units 41, 41 make the upper housing 2 rotatable with respect to the lower housing 3.

Figure 2:
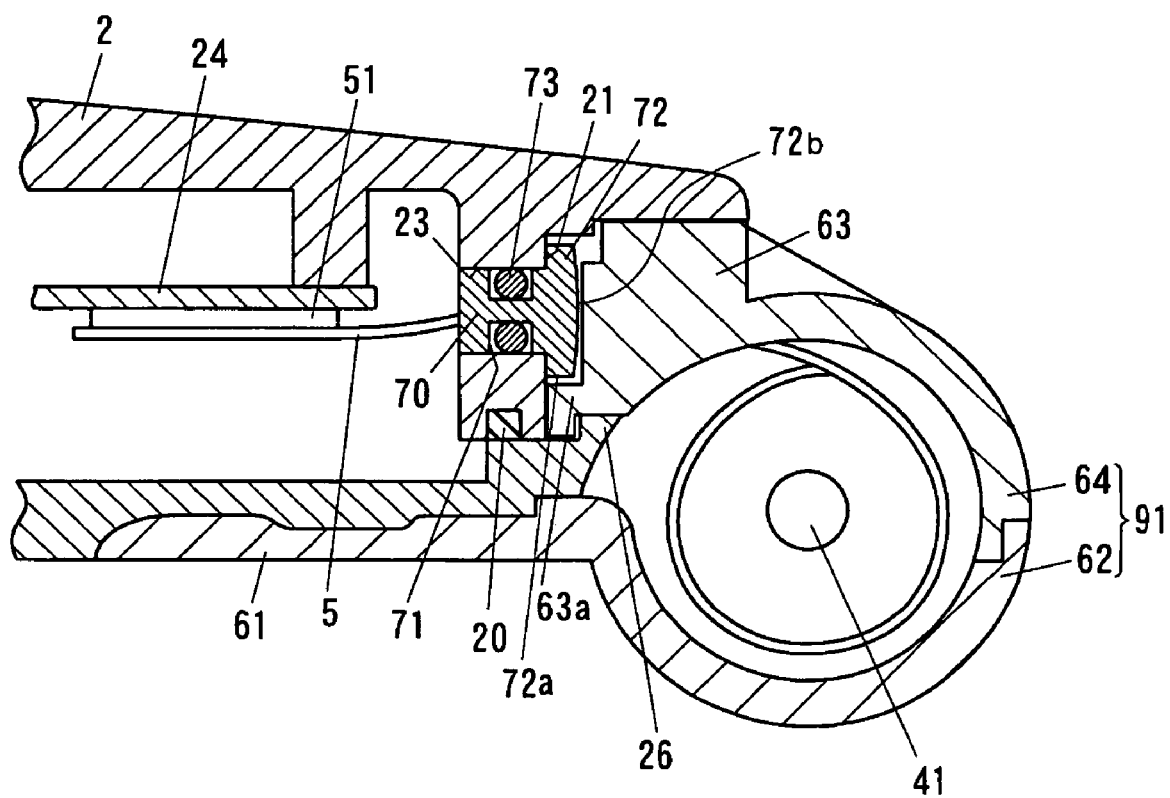
FIG. 2 is a cross-sectional view of an upper housing along a sectional line II in FIG. 1.
Figure 5:
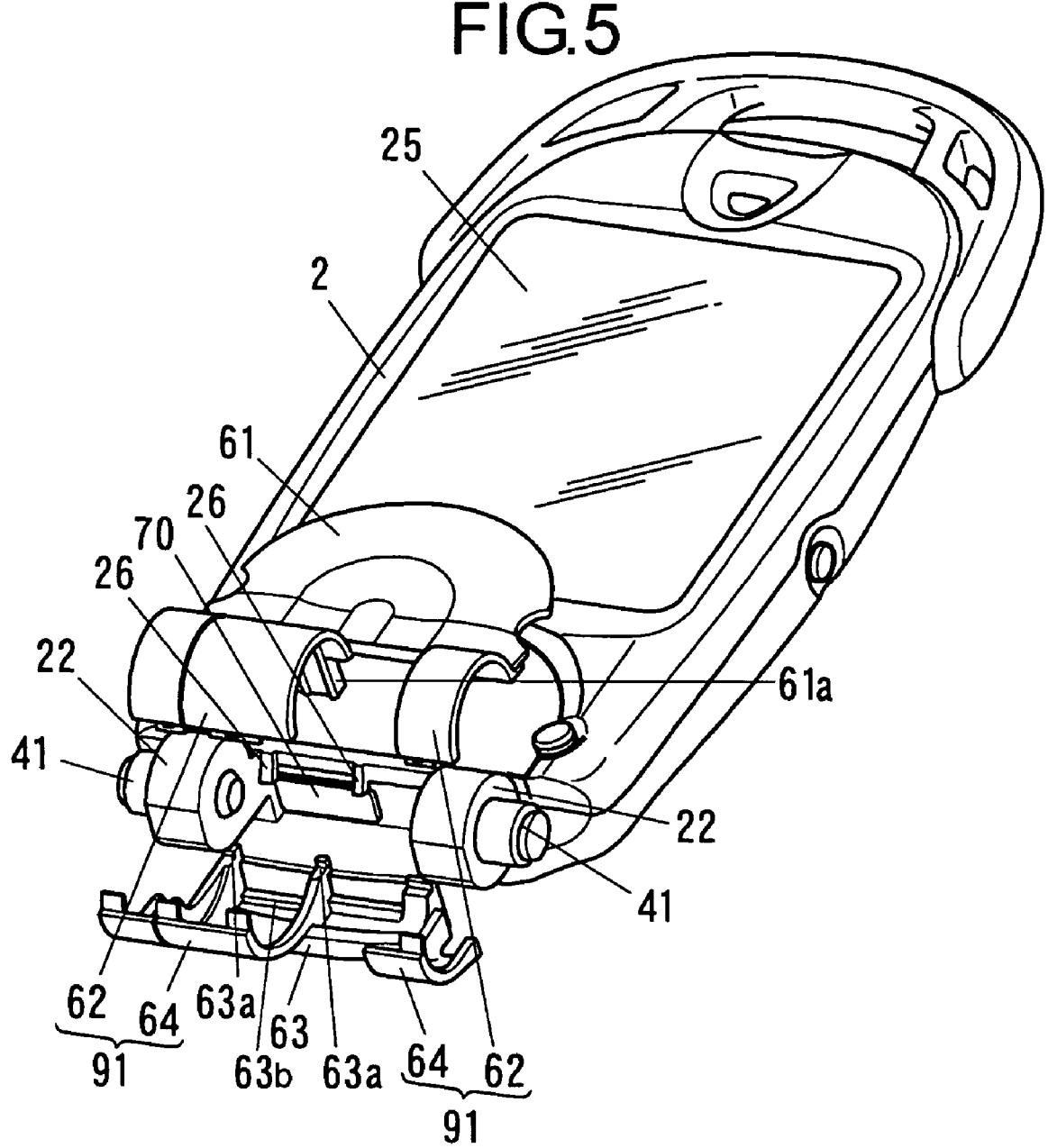
FIG. 5 is a perspective view illustrating a hinge cover member removed from the upper housing.

FIG. 2 is a cross-sectional view of an upper housing along a sectional line II in FIG. 1. As shown in FIG. 2, the upper housing 2 is of a waterproof type having an elastometric O ring 20 provided entirely around a fitted portion of the top casing and the bottom casing of the upper housing 2. The upper housing 2 accommodates a circuit board 24 having a display panel 25 and the like mounted thereon. The display panel 25 mounted on the circuit board 24 faces the front face of the upper housing 2 inside the upper housing 2 as shown in FIG. 5.

As shown in FIGS. 1 and 2, a through hole 23 elongated in a direction parallel to the axis of the hinge 4 is formed in the side face 21 of the upper housing 2 on the lower housing 3 side (on the hinge 4 side). More specifically, the through hole 23 is formed in that side face of one of the top casing and the bottom casing constituting the upper housing 2, i.e., the side face of the bottom casing in the embodiment. The through hole 23 extends through inward from the outer surface of the upper housing 2 (from the hinge 4 side). A connector 51 provided at one end portion of a belt-like flexible wiring board (FPC: Flexible Printed Circuit) 5 is led inside the upper housing 2 through the through hole 23, and is connected to the circuit board 24.

Figure 3:
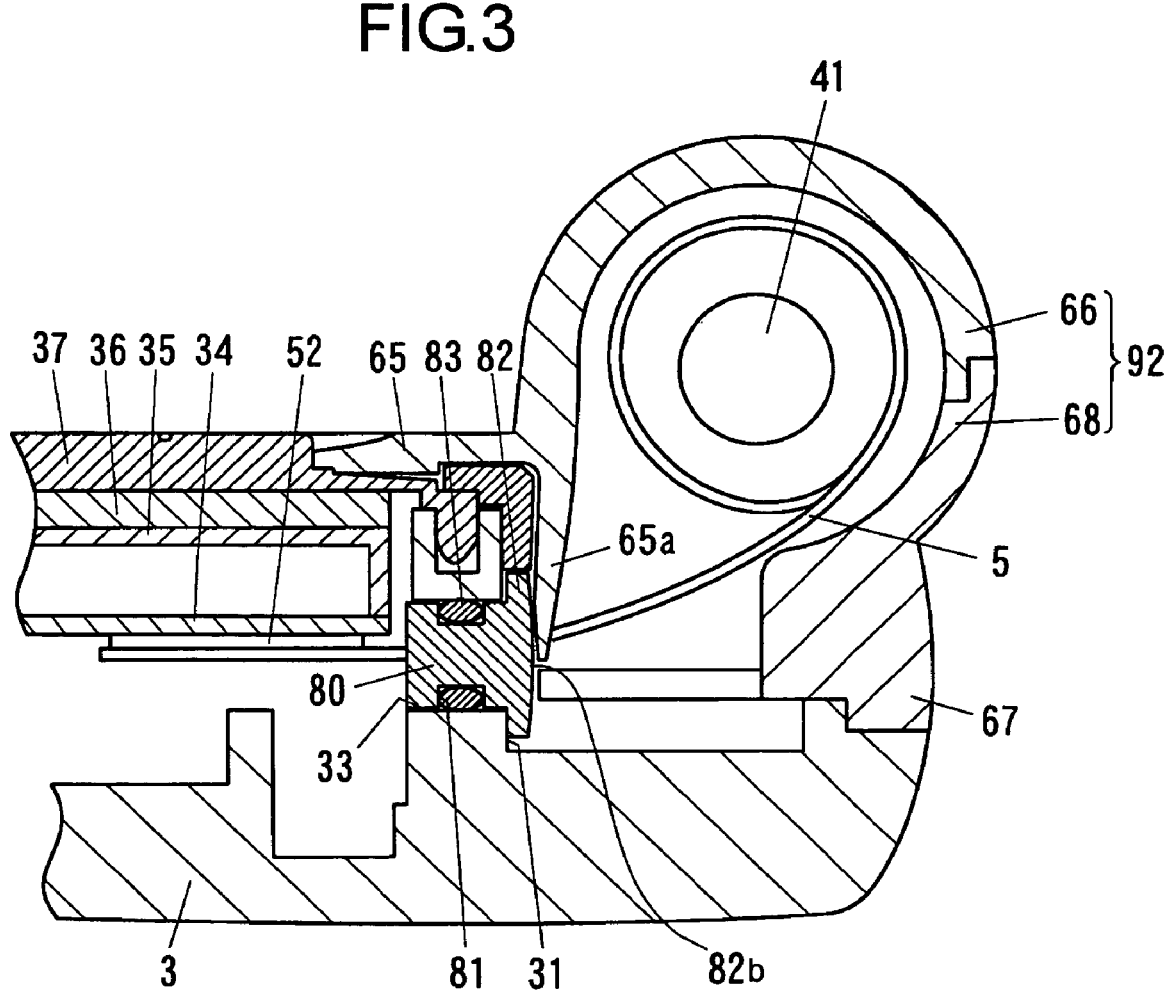
FIG. 3 is a cross-sectional view of a lower housing along a sectional line III in FIG. 1.

FIG. 3 is a cross-sectional view of the lower housing 3 along a sectional line III in FIG. 1. As shown in FIG. 3, the lower housing 3 accommodates a circuit board 34, which is covered with a shield casing 35. Mounted on the shield casing 35 is a switch sheet 36 which has a key sheet 37 mounted thereon.

With a key portion protruding from the front face of the lower housing 3, the key sheet 37 faces the front face of the lower housing 3. A packing that ensures waterproof at the fitted portion of the top casing and the bottom casing which constitute the lower housing 3 is formed integrally at the peripheral portion of the key sheet 37.

Thin press switches, such as dome switches, are provided on the switch sheet 36 in association with the respective keys. The switch sheet 36 is electrically connected to the circuit board 34.

As shown in FIGS. 1 and 3, a through hole 33 elongated in a direction parallel to the axis of the hinge 4 is formed in the side face 31 of the lower housing 3 on the hinge 4 side. More specifically, the through hole 33 is formed in that side face of one of the top casing and the bottom casing constituting the lower housing 3, i.e., the side face of the bottom casing in the embodiment. The through hole 33 extends through inward from the outer surface of the lower housing 3. A connector 52 provided at the other end portion of the flexible wiring board 5 is led inside the lower housing 3 through the through hole 33, and is connected to the circuit board 34. The circuit board 34 and the circuit board 24 are electrically connected together by the flexible wiring board 5 inserted into the through hole 23 and the through hole 33.

Figure 4:
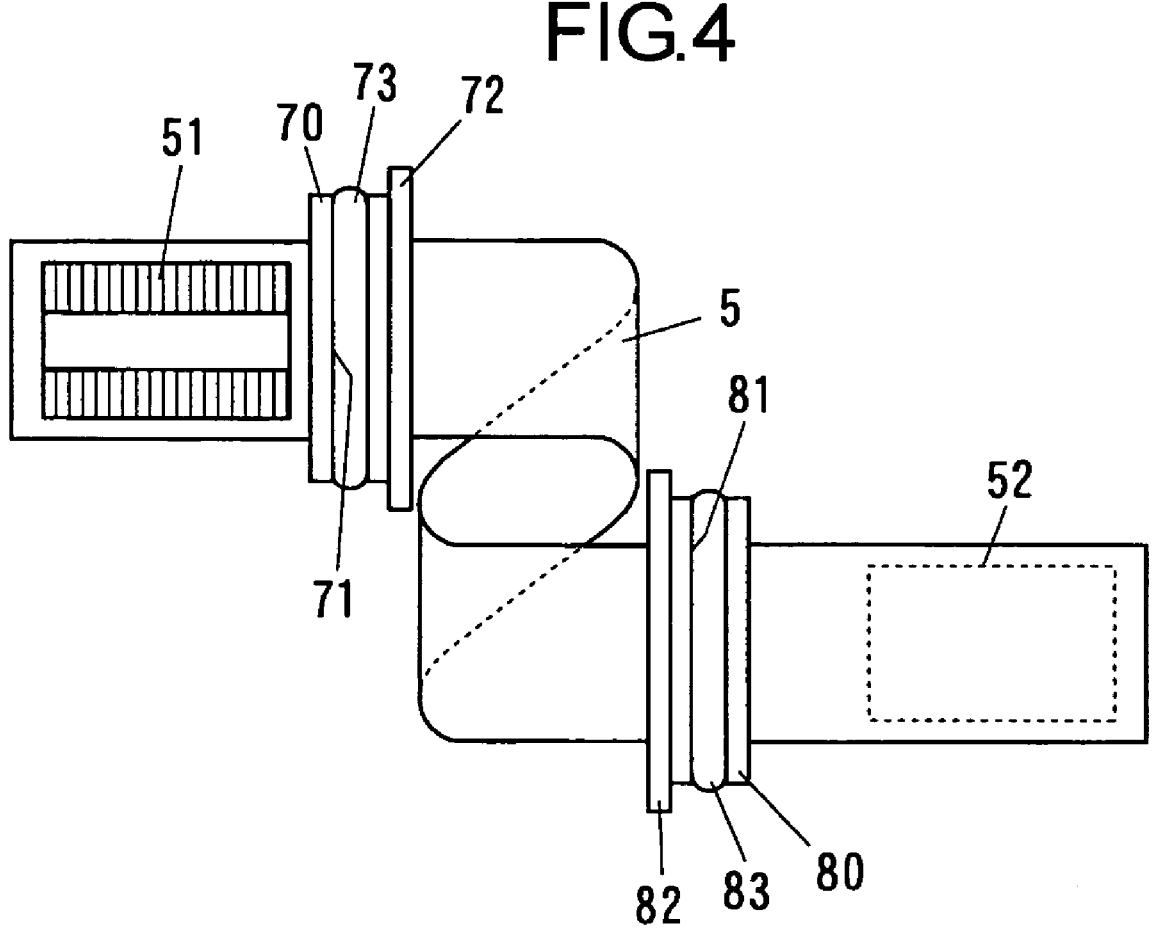
FIG. 4 is a plan view of a flexible wiring board.

FIG. 4 is a plan view of the flexible wiring board 5. The flexible wiring board 5 is laid out in such a way that the widthwise direction thereof is parallel to the axial direction of the hinges 4. The middle portion of the flexible wiring board 5 is wound around the axes of the hinges 4 in a spiral form.

The connector 51 and the connector 52 are provided at both ends of the flexible wiring board 5, respectively.

Waterproof caps 70 and 80 are integrally fitted to the flexible wiring board 5. The waterproof caps 70 and 80 serve to prevent water permeation into the upper housing 2 and the lower housing 3 through the through holes 23, 33. The waterproof caps 70 and 80 are respectively disposed near the connectors 51, 52 on the flexible wiring board 5, and are respectively fitted in the through holes 23, 33.

The waterproof cap 70, 80 may itself be formed of an elastometric material.

Alternatively, the waterproof cap may include a main part and an elastometric O ring 73, 83 which is fitted over the outer surface of the main part. Those structures can allow the waterproof cap itself or the main part of the waterproof cap to be integrally fitted to the flexible wiring board 5. That is, the waterproof cap or the main part of the waterproof cap is formed by covering a part of the flexible wiring board 5 as an insert material with a molten resin and solidifying the resin-covered part. The solidified resin becomes the waterproof cap or the main part of the waterproof cap.

The waterproof cap 70, 80 in the embodiment will be explained specifically. The waterproof cap 70, 80 has its main part formed by inserting a part of the flexible wiring board 5, and has the elastometric O ring 73, 83 fitted over the outer surface of the main part.

As shown in FIGS. 2 and 4, a groove 71 is formed in the outer surface of the middle portion of the waterproof cap 70 in a circumferential direction, and a flange 72 is protrusively formed on the outer surface of one end of the waterproof cap 70. The elastometric O ring 73 is fitted in the groove 71. As shown in FIGS. 3 and 4, like the waterproof cap 70, the waterproof cap 80 has a groove 81 and a flange 82 similarly formed, and the elastometric 0 ring 83 is fitted in the groove 81. Viewing the waterproof cap 70, 80 from one end of the flexible wiring board 5 to the other end thereof, the flange 72 of the waterproof cap 70 is located on the waterproof cap 80 side, and the flange 82 of the waterproof cap 80 is located on the waterproof cap 70 side. That is, the flange 72 and the flange 82 face each other.

The waterproof cap 70 with the O ring 73 fitted thereover is fitted in the through hole 23, so that the O ring 73 abuts on the inner wall of the through hole 23, as shown in FIG. 2. The flange 72 of the waterproof cap 70 engages with the side face 21 of the upper housing 2 entirely around the through hole 23, thereby preventing the waterproof cap 70 from going inside the upper housing 2. Likewise, the waterproof cap 80 with the O ring 83 fitted thereover is fitted in the through hole 33 with the O ring 83 abutting on the inner wall of the through hole 23, and the flange 82 engages with the side face 31 of the lower housing 3, as shown in FIG. 3.

As shown in FIG. 5, a hinge cover member 61 integral with a logo plate portion is mounted on the front face of the upper housing 2, and a hinge cover member 63 is mounted on the side face 21 of the upper housing 2. The hinge cover member 61 has two semicylindrical cover portions 62, 62 with different widths (lengths in the cylindrical direction). The hinge cover member 63 likewise has two semicylindrical cover portions 64, 64 with different widths. A combination of the wide cover portion 62 and the wide cover 5 portion 64, and a combination of the narrow cover portion 62 and the narrow cover portion 64 constitute two cylindrical covers 91, 91 with different widths. Referring to FIG. 5, the narrow, right cover 91 covers the right cylindrical body 22, and the wide, left cover 91 covers the left cylindrical body 22.

Figure 6:
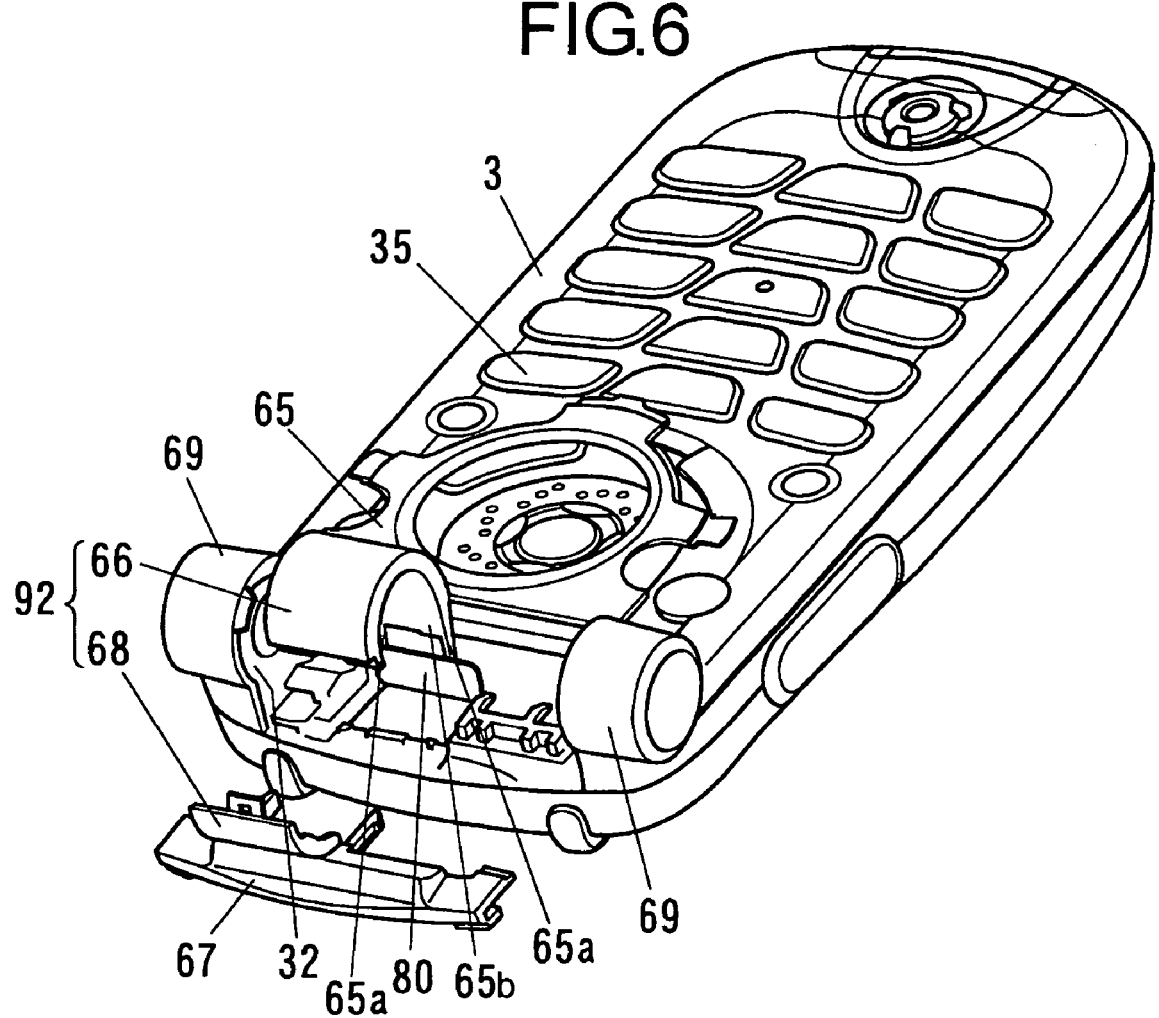
FIG. 6 is a perspective view illustrating a hinge cover member removed from the lower housing.

As shown in FIG. 6, a hinge cover member 65 integral with a key plate portion which covers around cursor keys is mounted on the front face of the lower housing 3, and a hinge cover member 67 is mounted on the side face 31 of the lower housing 3. The hinge cover member 65 has a semicylindrical cover portion 66. The hinge cover member 67 has a semicylindrical cover portion 68. A combination of the cover portion 66 and the cover portion 68 constitutes a cylindrical cover 92. The lower housing 3 has a pair of hinge covers 69, 69 attached thereto to respectively cover the cylindrical bodies 32, 32.

With the upper housing 2 and the lower housing 3 coupled together by the hinges 4, as the hinge cover members 61, 63, 65, 67 are attached, the cover 92 is positioned between the two covers 91, 91. Inner space covered with a part of the wide cover 91 (the left cover 91 in FIG. 5) and the cover 92 is defined between the pair of hinges 4. This inner space accommodates the middle portion of the flexible wiring board 5 which lies between the waterproof cap 70 and the waterproof cap 80. In other words, the flexible wiring board 5 is covered with the wide cover portion 62 of the hinge cover member 61, the wide cover portion 64 of the hinge cover member 63, the cover portion 66 of the hinge cover member 65, and the cover portion 68 of the hinge cover member 67. The hinge cover members 61 and 65 are not shown in FIG. 1, and the flexible wiring board 5 is not shown in FIGS. 5 and 6 for simplicity of illustration.

As shown in FIGS. 1, 2 and 5, a protrusion 63b has two hook-like claws 63a provided at the distal end portion thereof. The space between the two claws 63a is equal to or slightly wider than the width of the flexible wiring board 5. With the hinge cover member 63 mounted on the side face 21 of the upper housing 2, the distal ends of the claws 63a engage with claws 26 formed on the side face of the upper housing 2 (more specifically, the end portions of the inner wall of the top casing which are located on the hinge 4 side). Accordingly, the protrusion 63b is positioned in such a way as to partially cover a side face portion 72a and rear face portions (outer end face) 72b of the flange 72 of the waterproof cap 70 from outside the upper housing 2 (from the hinge 4 side). That is, the rear face portions 72b of that region of the flange 72 of the waterproof cap 70 which protrudes from the flexible wiring board 5 in the widthwise direction and the side face portion 72a continual with the rear face portion 72b are received by the claws 63a, and one rear face portion 72b of that region of the flange 72 of the waterproof cap 70 which protrudes from the flexible wiring board 5 in the thicknesswise direction is received by the distal end portion of the protrusion 63b positioned between the two claws 63a. The other rear face portion 72b is covered with a flat protrusion 61a formed at the base portion of the cover portion 62 of the hinge cover member 61, and is received by the distal end portion of the protrusion 61a.

In other words, the flange 72 of the waterproof cap 70 is held between the side face 21 of the upper housing 2 and the protrusion 63b and protrusion 61a, so that the undesirable pull-off of the waterproof cap 70 from the through hole 23 is prevented by the protrusion 63b and the protrusion 61a.

As shown in FIGS. 3 and 6, a protrusion 65b has two claws 65a provided at the distal end portion thereof. The space between the two claws 65a is equal to or slightly wider than the width of the flexible wiring board 5. With the hinge cover member 65 mounted on the lower housing 3, the protrusion 65b is positioned in such a way as to partially cover rear face portions 82b of the flange 82 of the waterproof cap 80 from outside the lower housing 3 (from the hinge 4 side). That is, the rear face portions (outer end faces) 82b of that region of the flange 82 of the waterproof cap 80 which protrudes from the flexible wiring board 5 in the widthwise direction are received by the claws 65a, and one rear face portion 82b of that region of the flange 82 of the waterproof cap 80 which protrudes from the flexible wiring board 5 in the thicknesswise direction is received by the distal end portion of the protrusion 65b positioned between the two claws 65a.

That is, the flange 82 of the waterproof cap 80 is held between the side face 31 of the lower housing 3 and the protrusion 65b, so that the undesirable pull-off of the waterproof cap 80 from the through hole 33 is prevented by the protrusion 65b.

According to the embodiment, as described above, as the waterproof caps 70, 80 respectively having the O rings 73, 83 fitted thereover are fitted in the respective through holes 23, 33, water will not penetrate inside the upper housing 2 and the lower housing 3.

As the waterproof caps 70, 80 are formed integral with the flexible wiring board 5 by insert molding, high adhesion and watertightness are guaranteed at the interfaces between the waterproof caps 70, 80 and the flexible- wiring board 5.

The protrusion 63b having the two claws 63a provided at the distal end portion thereof is provided at the cover portion 64 which covers the flexible wiring board 5 at the hinge cover member 63, and is laid out in such a way as to cover the side face portion 72a and the rear face portions 72b of the flange 72 of the waterproof cap 70. Even when a load to cause pull-off of the waterproof cap 70 of the flexible wiring board 5 from the through hole 23 of the upper housing 2 is applied to the waterproof cap 70, the side face portion 72a and the rear face portions 72b of the flange 72 of the waterproof cap 70 abut on the protrusion 63b and are received by the protrusion 63b. This causes the waterproof cap 70 to be held between the protrusion 63b and the side face 21 of the upper housing 2, so that the waterproof cap 70 does not come off the through hole 23. As a result, the embodiment can ensure high waterproof over a long period of time.

The protrusion 65b having the two claws 65a provided at the distal end portion thereof is provided at the cover portion 66 which covers the flexible wiring board 5 at the hinge cover member 65, and is laid out in such a way as to cover the rear face portions 82b of the flange 82 of the waterproof cap 80. Even when a load to cause pull-off of the waterproof cap 80 of the flexible wiring board 5 from the through hole 33 of the lower housing 3 is applied to the waterproof cap 80, the rear face portions 82b of the flange 82 of the waterproof cap 80 abut on the protrusion 65b and are received by the protrusion 65b. This causes the waterproof cap 80 to be held between the protrusion 65b and the side face 31 of the lower housing 3, so that the protrusion 65b ensures prevention of unintended pull-off of the waterproof cap 80 and high waterproof.

As the protrusion 63b, 65b having two claws is respectively formed integral with the hinge cover member 63, 65, merely mounting the hinge cover member 63, 65 onto the upper 2, 3 can prevent the pull-off of the waterproof cap 70, 80.

The invention is not limited to the embodiment, but may be modified in various forms and in various designs within the scope and spirit of the invention.

For example, although the hinge cover member 65 whose protrusion 65b for prevention of pull-off of the waterproof cap 80 is formed integral with the cover portion 66 which covers the flexible wiring board 5 is formed as a separate member from the case member that constitutes the lower housing 3, and is mounted on the front face or the top casing of the lower housing 3, the hinge cover member 65 may be formed integral with the top casing of the lower housing 3. That is, a cover portion which covers the flexible wiring board 5 may be formed on the case member constituting the casing, and may be provided with a pull-off preventing protrusion to prevent pull-off of the waterproof cap (waterproof member).

Although the foregoing description of the embodiment has been given of an example where the protrusion 63b, 65b having two claws is respectively provided at the cover portion 64, 66 for protection of the flexible wiring board 5, the protrusion 63b, 65b having no claws may be respectively provided at the cover portion 64, 66. Alternatively, claws alone may be provided at the cover portion 64, 66.

Although the foregoing description of the embodiment has been given of an example where each of the protrusion 63b, 65b has two claws 63a, 65a, both protrusion may have one claw 63a, 65a, or may have three or more claws.

While the foregoing description of the embodiment has been given of an example where pull-off prevention of both the waterproof caps 70, 80 respectively mounted to the upper housing 2 and the lower housing 3 is achieved by the protrusion 63b, 65b, only one of the waterproof caps 70, 80 may be subject to pull-off prevention.

While the foregoing description of the embodiment has been given of an example where the claws 63a for pull-off prevention of the waterproof cap 70 are shaped like hooks and the claws 65a for pull-off prevention of the waterproof cap 80 are formed flat, both claws may be hook-shaped or flat.

Although the foregoing description of the embodiment has been given of an example where when a load to cause pull-off of the waterproof cap 70, 80 from the through hole 23, 33 is applied to the waterproof cap 70, 80, the protrusion 63b, 65b and the claws 63a, 65a formed thereon abut on the waterproof cap 70, 80, the protrusion 63b, 65b and the claws 63a, 65a formed thereon may be laid out beforehand in such a way as to abut on the waterproof cap 70, 80.

In the embodiment, the waterproof cap 70, 80 which is a waterproof member to seal the through hole 23, 33 comprises the main part and the elastometric O ring 73, 83, and the main part is integrally attached to the flexible wiring board 5 by insert molding. However, the waterproof cap 70, 80 having the integrated O ring portion may be integrally attached to the flexible wiring board 5 by insert molding using an elastometric, soft elastic material for the waterproof cap 70, 80. The flexible wiring board 5 and the waterproof cap 70, 80 may be formed as separate members, after which both may be adhered together by a waterproof adhesive or the like.

Although the foregoing description of the embodiment has been given of an example where the flanges 72 and 82 are respectively provided on the waterproof caps 70 and 80, the flanges 72 and 82 may not be needed if, for example, the up and down widths of the through holes 23, 33 are made narrower on the inner end side as a means of preventing the waterproof caps from coming off into the respective casings.

In the embodiment described above, the through holes 23, 33 are respectively formed in the upper housing 2 and the lower housing 3 to permit insertion of the flexible wiring board 5. When a through hole is formed only in one of the casings and the lead portion of the flexible wiring board 5 from the other casing takes another waterproof structure, however, the invention has only to be applied to waterproofing of the through hole of that one casing.

Although the explanation has been given of a case where the cellular phone 1 is taken as an example of an electronic device, the invention may also be applied to a case where the flexible wiring board is provided in a laptop computer, a digital camera, a wrist watch, a PDA (Personal Digital Assistance), an electronic organizer, a portable radio telephone, and other foldable electronic devices.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application claims the priority of Japanese Patent Application No. 2005-169648 filed on Jun. 9, 2005 the contents of which are incorporated herein in their entirety.

What is claimed is:

1. A portable electronic device comprising:
   a first housing which accommodates a first circuit board;
   a second housing which is coupled to the first housing in an openable/closable manner, and accommodates a second circuit board;
   a flexible wiring board which electrically connects the first circuit board and the second circuit board together; and
   a cover member attached to at least one of the first housing and the second housing in such a way as to cover the flexible wiring board,
   wherein at least one of the first housing and the second housing has a through hole through which the flexible wiring board is inserted,
   the flexible wiring board has a waterproof member to be fitted in the through hole to seal the though hole,
   the cover member has a protrusion which covers the waterproof member from outside, and
   wherein the protrusion has a claw.

2. The portable electronic device according to claim 1, wherein the waterproof member has a flange to be engaged with an outer surface of at least one of the first housing and the second housing, and the protrusion abuts on the flange which is held between the protrusion and the outer surface of at least one of the first housing and the second housing.

3. The portable electronic device according to claim 2, wherein the claw is a hook-like claw, which covers a side face or a rear face of the flange.

4. The portable electronic device according claim 1, wherein the cover member is formed integrally with the at least one of the first housing and the second housing.

* * * * *